United States Patent Office 2,875,242
Patented Feb. 24, 1959

2,875,242

PROCESS FOR THE PRODUCTION OF 1-NITRONAPHTHALENE-3,6- AND 3,7-DISULFONIC ACID

Hans Roos and Kurt Briesewitz, Leverkusen-Bayerwerk, Germany, assignors to Farbenfabriken Bayer Aktiengesellschaft, Leverkusen, Germany, a corporation of Germany No Drawing. Application March 14, 1957
Serial No. 645,883

Claims priority, application Germany March 19, 1956

1 Claim. (Cl. 260—505)

This invention relates to a process for the production of 1-nitronaphthalene-3,6- and 3,7-disulfonic acid.

The sulfonation of 1-nitronaphthalene-6- or 7-sulfonic acid to form 1-nitronaphthalene-3,6- or 3,7-disulfonic acid is not possible by means of the prior known processes, since practically no sulfonation occurs when the 1-nitronaphthalene-6- or 7-sulfonic acids are treated with oleum having a high content of $SO_3$ at temperatures up to 110° C., while at higher temperatures oxidation products are obtained and carbonization occurs.

It has now been found that 1-nitronaphthalene-6- or 7-sulfonic acid can readily be sulfonated to form 1-nitronaphthalene-3,6- or 3,7-disulfonic acid if the alkali metal or ammonium salts of the acids are treated in the presence of alkali metal or ammonium sulfates with agents having a strong sulfonating effect.

In one preferred embodiment of the process of the invention, the ammonium salts of 1-nitronaphthalene-6- or 7-sulfonic acid are used and the sulfonation is carried out in the presence of ammonium sulfate. The alkali metal sulfates or the ammonium sulfate can be added to the reaction mixture in varying amounts. In general an amount of 10–60% proves to be the most effective one. Thereby the higher amounts of the sulfates are preferably used if the sulfonation is carried out with higher concentrated sulfonating agents, i. e. with fuming sulfuric acid with a high content of sulfur trioxide.

The sulfonation can be effected in the usual manner, for example by using fuming sulfuric acid. This fuming sulfuric acid may contain 5–40%, preferably 10–30% of sulfur trioxide. The sulfonation can be carried out at room temperature or preferably at higher temperatures up to about 150° C.

The 1-nitronaphthalene-3,6- or 3,7-disulfonic acid obtained by the novel process can be separated in known manner by addition of a salt and be further processed, for example reduced. If desired, the further processing can also take place directly without this isolation.

Example 1

530 kg. of ammonium sulfate are dissolved while cooling in 2300 kg. of 100% sulfuric acid. 918 kg. of the ammonium salt of 1-nitronaphthalene-6-sulfonic acid are thereafter introduced. 3800 kg. of 66% oleum are run in while cooling at a temperature between 30 and 50° C. and the mixture is heated for 8 hours at 90° C. The reaction mixture is then aded to ice water and separation is effected with 20% sodium chloride; 1150 kg. of the sodium salt of 1-nitronaphthalene-3,6-disulfonic acid are obtained, this representing 90% of the theoretical.

Instead of the 1-nitronaphthalene-6-sulfonic acid there can be used as well the 1-nitronaphthalene-7-sulfonic acid. Furthermore the ammonium sulfate can be replaced by an alkali sulfate such as sodium sulfate.

Example 2

530 kg. of ammonium sulfate are dissolved while cooling in 2300 kg. of 100% sulfuric acid. 918 kg. of the ammonium salt of 1-nitronaphthalene-7-sulfonic acid are then introduced. 3800 kg. of 66% oleum are run in while cooling at a temperature between 30 and 50° C. and the mixture is heated for 8 hours at 90° C. The reaction mixture is thereafter added to water and the excess nitrous gases are blown off. Reduction then takes place in known manner with iron, and 1-naphthylamine-3,7-disulfonic acid is separated by adding 20% of sodium chloride to the filtered solution. Yield: 955 kg. of disodium salt=81% of the theoretical.

We claim:

A process for the production of a member selected from the group consisting of 1-nitronaphthalene-3,6- and 3,7-disulfonic acid, which comprises sulfonating a member selected from the group consisting of the alkali metal salts and ammonium salts of a member selected from the group consisting of 1-nitronaphthalene-6- and 7-sulfonic acid in the presence of a member selected from the group consisting of an alkali metal sulfate and ammonium sulfate.

References Cited in the file of this patent

UNITED STATES PATENTS 2,143,963    Tinker _____ Jan. 17, 1939

OTHER REFERENCES

Suter: The Organic Chemistry of Sulfur, pp. 222–24 (1944).

Danish et al.: Journal of American Chemical Society, vol. 76, pp. 6144–6150 (1954).